United States Patent
Wong

(10) Patent No.: US 7,630,382 B1
(45) Date of Patent: Dec. 8, 2009

(54) METHOD AND SYSTEM FOR PROVIDING TRANSPORT OF CHANNELIZED CIRCUITS OF ARBITRARY BIT RATE THROUGH ASYNCHRONOUS TRANSFER MODE (ATM) CIRCUIT EMULATION SERVICES (CES)

(75) Inventor: Chi-Yin Wong, Los Gatos, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 708 days.

(21) Appl. No.: 10/801,489

(22) Filed: Mar. 15, 2004

Related U.S. Application Data

(60) Provisional application No. 60/512,420, filed on Oct. 16, 2003.

(51) Int. Cl.
*H04L 12/28* (2006.01)
*H04L 12/56* (2006.01)

(52) U.S. Cl. ............... 370/395.61; 370/395.1; 370/395.53

(58) Field of Classification Search ............. 370/395.1, 370/395.61, 395.53
See application file for complete search history.

(56) References Cited

U.S. PATENT DOCUMENTS

| | | | | |
|---|---|---|---|---|
| 6,081,528 A | * | 6/2000 | Thomann | 370/395.7 |
| 2002/0122426 A1 | * | 9/2002 | Lindquist et al. | 370/395.1 |
| 2003/0185212 A1 | * | 10/2003 | Kelly et al. | 370/395.1 |
| 2004/0213157 A1 | * | 10/2004 | Karlsson et al. | 370/235 |

OTHER PUBLICATIONS

ATM Forum, AF-VMOA-0145.000, "Voice and Multimedia Over ATM—Loop Emulation Service Using AAL2", Jul. 2000, pp. 6, 10 and 12.*
B-ISDN ATM adaptation layer specification: type 1 AAL; Series I:Integrated services digital network, overall network aspects and functions-protocol layer requirements, ITU-T I.363.1, Aug. 1996.
Circuit emulation service interoperability specification version 2.0, The ATM Forum Technical Committee, Jan. 1997.

* cited by examiner

*Primary Examiner*—Seema S. Rao
*Assistant Examiner*—Jianye Wu
(74) *Attorney, Agent, or Firm*—Townsend and Townsend and Crew

(57) ABSTRACT

A system for managing circuit emulation service over an Asynchronous Transfer Mode (ATM) network is provided. The system includes control logic configured to receive channelized circuit data from a client, the channelized circuit data being transmitted at an arbitrary rate. The channelized circuit data is formatted into one or more ATM cells. Each ATM cell has a payload. The payload has a number of octets and corresponding validity fields. Each validity field is used to indicate whether the associated octet contains valid data. The one or more ATM cells are transmitted across the ATM network. By examining the validity fields, the transmission of the one or more ATM cells effectively results in transmission of the channelized circuit data at the arbitrary rate over the ATM network. The arbitrary rate is not a multiple of a fundamental rate.

15 Claims, 3 Drawing Sheets

METHOD AND SYSTEM FOR PROVIDING TRANSPORT OF CHANNELIZED CIRCUITS OF ARBITRARY BIT RATE THROUGH ASYNCHRONOUS TRANSFER MODE (ATM) CIRCUIT EMULATION SERVICES (CES)

CROSS-REFERENCES TO RELATED APPLICATIONS

The present application claims the benefit of priority under 35 U.S.C. § 119 from U.S. Provisional Patent Application Ser. No. 60/512,420, entitled "METHOD AND APPARATUS FOR TRANSPORT OF CHANNELIZED CIRCUITS OF ARBITRARY BIT RATE THROUGH ASYNCHRONOUS TRANSFER MODE (ATM) CIRCUIT EMULATION SERVICE" filed on Oct. 16, 2003, the disclosure of which is hereby incorporated by reference in its entirety for all purposes.

BACKGROUND OF THE INVENTION

The present invention generally relates to network communications and, more specifically, to a method and system for providing improved circuit emulation service.

Circuit emulation service (CES) technique has been widely developed in the telecommunication industry for transport of channelized or unchannelized bandwidth over Asynchronous Transfer Mode (ATM) networks. Such technique is well known and is fully documented through industry standardization bodies such as ATM Forum and International Telecommunication Union (ITU-T). See, for example, "Circuit Emulation Service Interoperability Specification Ver. 2.0 (ATM Forum, January 1997)" and "B-ISDN ATM Adaptation Layer Specification: Type 1 AAL (ITU-T I.363.1, August 1996)".

For structured CES, the standardized technique uses the "structured data transfer" method in AAL1 that employs a pointer to delineate the frame boundary. One or more octets within the AAL user information field of a frame can be assigned to a channel. Using a 8 KHz frame rate as an example, a channel with only one octet per frame would represent a 64 kbps circuit. A channel with 2 octets assigned per frame would represent a 128 kbps circuit and, in general, a channel with N octets per frame would be an N×64 kbps circuit.

The foregoing method works well in an environment where all channels have a common frame rate, for example, 8 KHz, for digitized voice in a time-division-multiplex (TDM) network. However, for equipment such as access aggregators that handle diverse traffic types and rates, it is difficult to achieve an optimal and uniform frame rate in such an environment. As a result, the standard CES technique cannot be used to transport all traffic between equipment due to the N×64 kbps (assuming a 8 KHz frame) restriction.

Hence, it would be desirable to develop a method and system that is capable of solving the foregoing problem, as well as others, by providing transport of channelized circuits of arbitrary bit rate.

BRIEF SUMMARY OF THE INVENTION

A system for managing circuit emulation service over an Asynchronous Transfer Mode (ATM) network is provided. Without the system of the present invention, each client in the ATM network has a fundamental rate for transmitting data. In one exemplary embodiment, the system includes control logic configured to receive channelized circuit data from a client, the channelized circuit data being transmitted at an arbitrary rate. The channelized circuit data is formatted into one or more ATM cells. Each ATM cell has a payload. The payload has a number of octets and corresponding validity field. Each validity field is used to indicate whether the associated octet contains valid data. The one or more ATM cells are transmitted across the ATM network. By examining the validity fields and processing the associated octets accordingly, the transmission of the one or more ATM cells effectively results in transmission of the channelized circuit data at the arbitrary rate over the ATM network. The arbitrary rate is not a multiple of the fundamental rate. The arbitrary rate can be either higher or lower than the fundamental rate.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
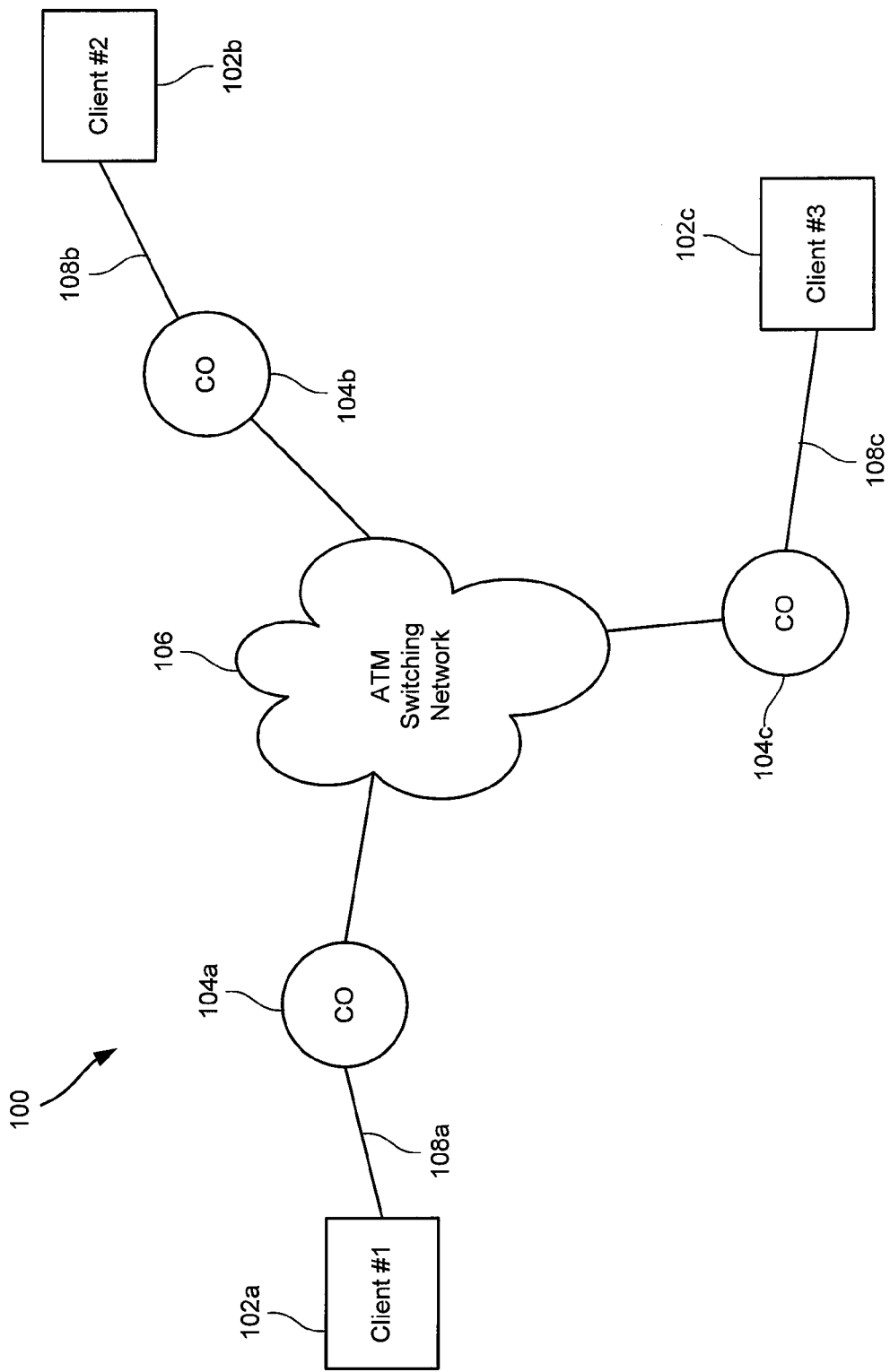
FIG. 1 is a simplified block diagram illustrating an Asynchronous Transfer Mode (ATM) network configuration that can be used with the present invention.

The present invention in the form of one or more exemplary embodiments will now be described. FIG. 1 is a simplified block diagram illustrating an ATM network configuration that can be used with the present invention. As shown in FIG. 1, the ATM network 100 includes a number of clients 102, a number of central offices 104 and an ATM switching network or switches 106. A client 102 is coupled to a central office 104 via a leased line 108, such as, a T1 or T3 line. The central office 104, in turn, is coupled to the ATM switching network 106. The central offices 104 receive traffic from corresponding clients 102 via the leased lines 108. The central offices 104 further convert the traffic for transmission over the ATM switching network 106. From the client's perspective, the use of the ATM switching network 106 is transparent. Circuit emulation service (CES) is used to render transmission over the ATM switching network 106 possible. It should be understood that other possible network configurations can be used in connection with the present invention. For example, there are other network configurations where the ATM cells are transported between clients 102 via a private ATM switching network without a central office. Based on the disclosure and teachings provided herein, a person of ordinary skill in the art will know of other network configurations that can be used in connection with the present invention.

Figure 2:
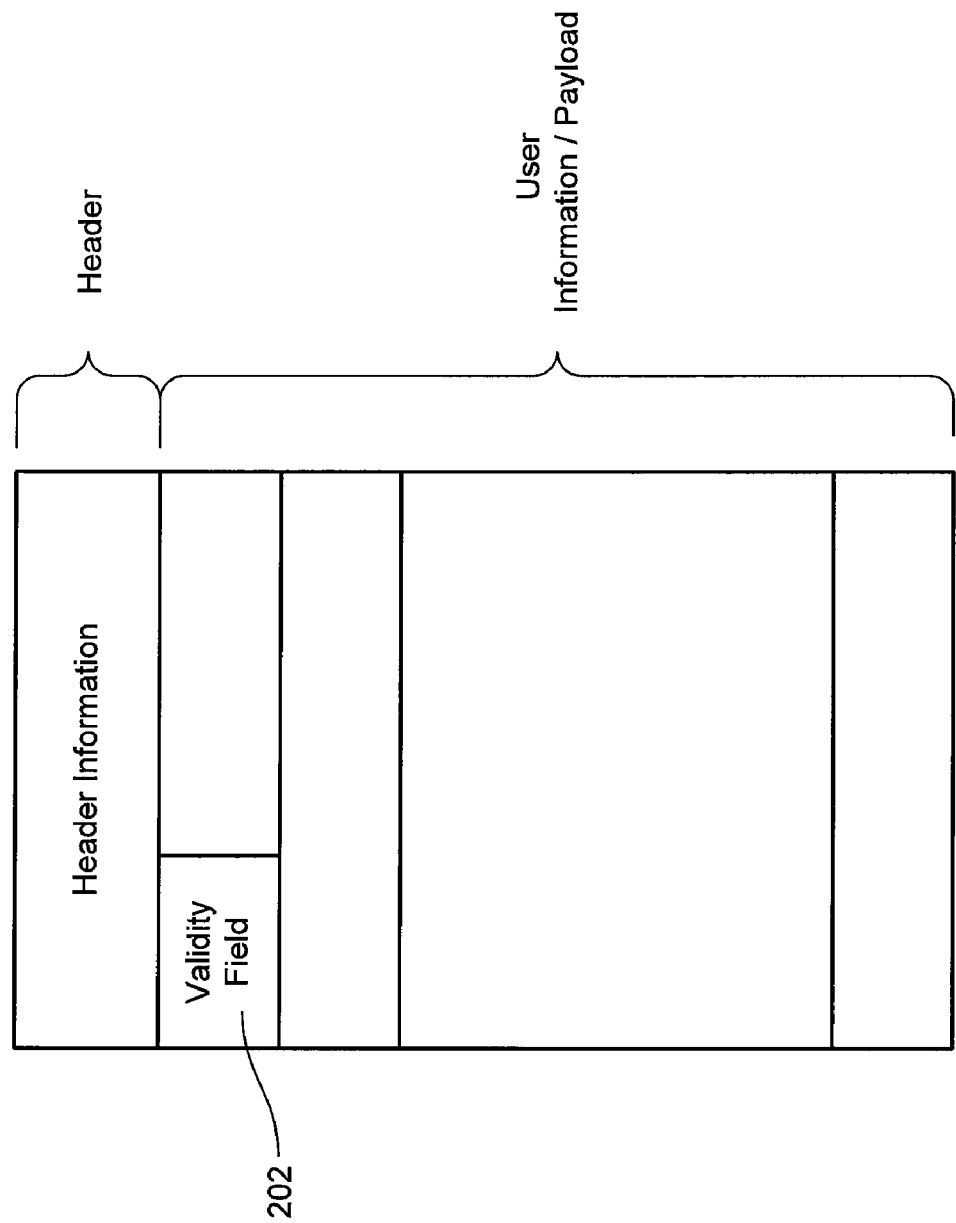
FIG. 2 is a simplified diagram illustrating the format for an ATM cell in accordance with the present invention.

In one exemplary aspect, the present invention allows transport of channelized circuits of arbitrary bit rate through ATM CES. This is accomplished by including a "validity" field for each octet in the AAL (ATM Adaptation Layer) user information or payload field in an ATM cell. FIG. 2 is a simplified diagram illustrating the format for an ATM cell in accordance with the present invention. As shown in FIG. 2, there is a "validity" field 202 associated with each octet. The "validity" field 202 is used to indicate whether the associated octet contains valid data or information. If the "validity" field 202 indicates a "valid" status, then the associated octet contains valid data; otherwise, if the "validity" field 202 indicates an "invalid" status, then the associated octet contains invalid data and thus can be ignored. By examining the "validity" field 202, a processor processing the corresponding ATM cell can then determine whether to deploy the appropriate resources to process the associated octet. It should be understood that header and other payload information as shown in FIG. 2 will be appreciated by a person of ordinary skill in the art.

Figure 3:
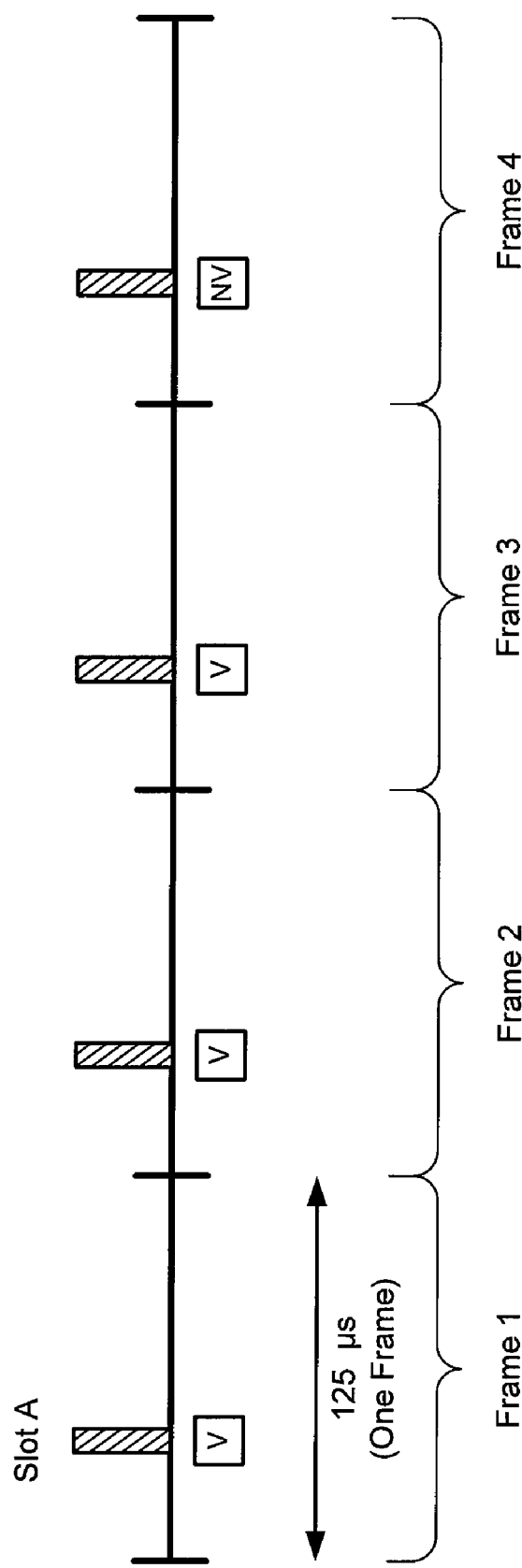
FIG. 3 is a simplified timing diagram showing an illustrative example of operations of the present invention.

The use of the "validity" field 202 also allows channelized circuit data to be transported over an ATM network at any arbitrary bit rate. The following is an illustrative example. Using the 8 KHz frame rate (i.e., 125 μs per frame and each 8-bit slot at a fundamental rate of 64 kbps) as an example, over an average of 4 frames, a 48 kbps circuit would have 3 "valid" octets and 1 invalid (empty) octet. FIG. 3 is a graphical illustration of the foregoing example. Since the transmitting circuit is a 48 kbps circuit, only ¾ (48/64) of the 64 kbps bandwidth needs to be utilized. That is, the corresponding slot or octet in every fourth frame contains invalid (empty) data and thus can be ignored. As shown in FIG. 3, the "validity" fields for the corresponding slots A in the first three frames show a "valid" status, while the "validity" field for the corresponding slot A in the last frame shows an "invalid" status. Since only ¾ of the 64 kbps bandwidth is utilized, a bit rate of 48 kbps is effectively achieved. Similarly, if the transmitting circuit has a higher bit rate than the fundamental rate, such higher bit rate can be accommodated. For example, if the transmitting circuit is a 96 kbps circuit, then two slots (octets) in each frame can be used for that one particular circuit and the corresponding two slots in every fourth (4th) frame are ignored (by having their associated "validity" fields showing an "invalid" status). Based on the disclosure and teachings provided herein, it should be clear to a person of ordinary skill in the art that the foregoing concept can be extended to any arbitrary bit rates below and above the fundamental rate (64 kbps in this example).

The frame rate can also be arbitrary. 8 KHz is chosen here for purpose of illustration only. As such, circuits of diverse bit rates can be transported through structured CES technique with the benefit of consolidating different types of traffic through a single ATM processor.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

Furthermore, it should be understood that the present invention can be incorporated or integrated into various components of a computer network. In one exemplary embodiment, the present invention is integrated into traffic aggregation equipment, such as, an intelligent bandwidth manager. Based on the disclosure and teachings provided herein, a person of ordinary skill in the art will know of various ways and/or methods to deploy the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for managing circuit emulation service over an Asynchronous Transfer Mode (ATM) network, comprising:
   control logic configured to receive channelized circuit data, the channelized circuit data being transmitted at an arbitrary rate;
   control logic configured to format the channelized circuit data into one or more ATM cells, each ATM cell having a payload, the payload having a plurality of octets and corresponding validity fields, each validity field being associated with one octet of the plurality of octets, the validity field indicating whether the associated octet contains valid data, wherein the control logic is configured to selectively include data in a first subset of the plurality of octets and not include data in a second subset of the plurality of octets of each ATM cell of the one or more ATM cells so that transmission of the one or more ATM cells results in transmission of the channelized circuit data at the arbitrary rate, wherein the control logic is configured to set the validity fields associated with the first subset of the octets of the payload of each of the one or more ATM cells to a valid status to indicate that data is included in the first subset of octets, and wherein the control logic is further configured to set the validity fields associated with the second subset of the octets of the payload of each of the one or more ATM cells to an invalid status to indicate that no data is included in the second subset of octets; and
   control logic configured to transmit the one or more ATM cells across the ATM network;
   wherein the transmission of the one or more ATM cells effectively results in transmission of the channelized circuit data at the arbitrary rate over the ATM network;
   wherein the arbitrary rate is achieved by adjusting a ratio of a number of octets in the first subset of octets to a number of octets in the second subset of octets for each of the one or more ATM cells; and
   wherein the arbitrary rate is not a multiple of a fundamental rate.

2. The system of claim 1 wherein the arbitrary rate is less than the fundamental rate.

3. The system of claim 1 wherein the arbitrary rate is higher than the fundamental rate.

4. Traffic aggregation equipment incorporating the system as recited in claim 1.

5. A system for managing circuit emulation service over an Asynchronous Transfer Mode (ATM) network, comprising:
   a first ATM processor configured to:
      receive channelized circuit data, the channelized circuit data being transmitted at an arbitrary rate;
      format the channelized circuit data into one or more ATM cells, each ATM cell having a payload, the payload having a plurality of octets and corresponding validity fields, each validity field being associated with one octet of the plurality of octets, the validity field indicating whether the associated octet contains valid data, wherein the first ATM processor is configured to selectively include data in a first subset of the plurality of octets and not include data in a second subset of the plurality of octets of each ATM cell of the one or more ATM cells so that transmission of the one or more ATM cells results in transmission of the channelized circuit data at the arbitrary rate, wherein the first ATM processor is configured to set the validity fields associated with the first subset of the octets of the payload of each of the one or more ATM cells to a valid status to indicate that data is contained in the first subset of octets, and wherein the first AMT processor is further configured to set the validity fields associated with the second subset of the octets of the payload of each of the one or more ATM cells to an invalid status to indicate that no data is contained in the second subset of octets; and transmit the one or more ATM cells across the ATM network; and a second ATM processor configured to receive and process the one or more ATM cells transmitted from the first ATM processor;

wherein the transmission of the one or more ATM cells effectively results in transmission of the channelized circuit data at the arbitrary rate over the ATM network;

wherein the arbitrary rate is achieved by adjusting a ratio of a number of octets in the first subset of octets to a number of octets in the second subset of octets for each of the one or more ATM cells; and wherein the arbitrary rate is not a multiple of a fundamental rate.

6. The system of claim 5 wherein the second ATM processor processes each ATM cell based on the validity fields and the associated octets contained therein;

wherein if a validity field indicates a "valid" status, the associated octet is considered to be containing valid data and will be processed, and if the validity field indicates an "invalid" status, the associated octet is considered to be containing invalid data and will not be processed; and wherein by processing the one or more ATM cells based on the validity fields contained therein, the transmission of the one or more ATM cells effectively results in transmission of the channelized circuit data at the arbitrary rate over the ATM network.

7. The system of claim 5 wherein the arbitrary rate is less than the fundamental rate.

8. The system of claim 5 wherein the arbitrary rate is higher than the fundamental rate.

9. A method for managing circuit emulation service over an Asynchronous Transfer Mode (ATM) network, the method comprising:

receiving channelized circuit data, the channelized circuit data being transmitted at an arbitrary rate;

formatting the channelized circuit data into one or more ATM cells, each ATM cell having a payload, the payload having a plurality of octets and corresponding validity fields, each validity field being associated with one octet of the plurality of octets, the validity field indicating whether the associated octet contains valid data, wherein formatting the channelized circuit data into one or more ATM cells further comprises:

selectively including data in a first subset of the plurality of octets and not include data in a second subset of the plurality of octets of each ATM cell of the one or more ATM cells so that transmission of the one or more ATM cells results in transmission of the channelized circuit data at the arbitrary rate;

setting the validity fields associated with the first subset of the octets of the payload of each of the one or more ATM cells to a valid status to indicate that data is contained in the first subset of octets; and setting the validity fields associated with the second subset of the octets of the payload of each of the one or more ATM cells to an invalid status to indicate that no data is contained in the second subset of octets; and transmitting the one or more ATM cells across the ATM network;

wherein the transmission of the one or more ATM cells effectively results in transmission of the channelized circuit data at the arbitrary rate over the ATM network;

wherein the arbitrary rate is achieved by adjusting a ratio of a number of octets in the first subset of octets to a number of octets in the second subset of octets for each of the one or more ATM cells; and wherein the arbitrary rate is not a multiple of a fundamental rate.

10. The method of claim 9 wherein the arbitrary rate is less than the fundamental rate.

11. The method of claim 9 wherein the arbitrary rate is higher than the fundamental rate.

12. A method for managing circuit emulation service over an Asynchronous Transfer Mode (ATM) network, the method comprising:

directing a first ATM processor to:

receive channelized circuit data, the channelized circuit data being transmitted at an arbitrary rate;

format the channelized circuit data into one or more ATM cells, each ATM cell having a payload, the payload having a plurality of octets and corresponding validity fields, each validity field being associated with one octet of the plurality of octets, the validity field indicating whether the associated octet contains valid data, wherein directing the first ATM processor to format the channelized circuit data into one or more ATM cells further comprises directing the first ATM processor to:

selectively include data in a first subset of the plurality of octets and not include data in a second subset of the plurality of octets of each ATM cell of the one or more ATM cells so that transmission of the one or more ATM cells results in transmission of the channelized circuit data at the arbitrary rate;

set the validity fields associated with the first subset of the octets of the payload of each of the one or more ATM cells to a valid status to indicate that data is contained in the first subset of octets; and set the validity fields associated with the second subset of the octets of the payload of each of the one or more ATM cells to an invalid status to indicate that no data is contained in the second subset of octets; and transmit the one or more ATM cells across the ATM network; and directing a second ATM processor to receive and process the one or more ATM cells transmitted from the first ATM processor;

wherein the transmission of the one or more ATM cells effectively results in transmission of the channelized circuit data at the arbitrary rate over the ATM network;

wherein the arbitrary rate is achieved by adjusting a ratio of a number of octets in the first subset of octets to a number of octets in the second subset of octets for each of the one or more ATM cells; and wherein the arbitrary rate is not a multiple of a fundamental rate.

13. The method of claim 12 further comprising:

directing the second ATM processor to process each ATM cell based on the validity fields and the associated octets contained therein;

wherein if a validity field indicates a "valid" status, the associated octet is considered to be containing valid data and will be processed, and if the validity field indicates an "invalid" status, the associated octet is considered to be containing invalid data and will not be processed; and wherein by processing the one or more ATM cells based on the validity fields contained therein, the transmission of the one or more ATM cells effectively results in transmission of the channelized circuit data at the arbitrary rate over the ATM network.

14. The method of claim 12 wherein the arbitrary rate is less than the fundamental rate.

15. The method of claim 12 wherein the arbitrary rate is higher than the fundamental rate.

* * * * *

UNITED STATES PATENT AND TRADEMARK OFFICE
CERTIFICATE OF CORRECTION

PATENT NO. : 7,630,382 B1 Page 1 of 1
APPLICATION NO. : 10/801489
DATED : December 8, 2009
INVENTOR(S) : Chi-Yin Wong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Second Day of November, 2010

David J. Kappos
*Director of the United States Patent and Trademark Office*